July 15, 1930.    R. H. RANGER    1,770,493
METHOD AND APPARATUS FOR PYRO-RECORDING
Original Filed Aug. 12, 1926    4 Sheets-Sheet 1
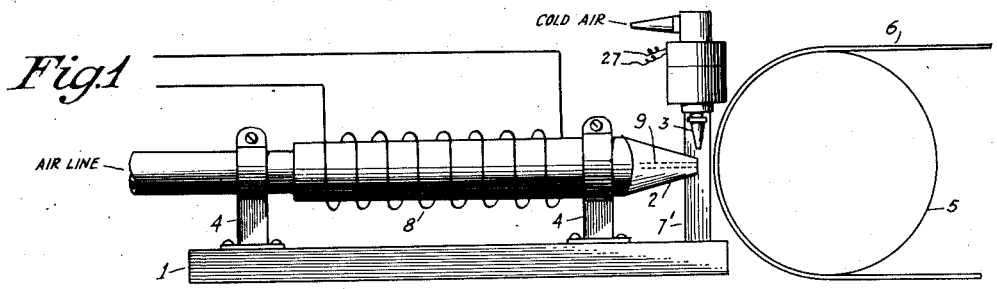
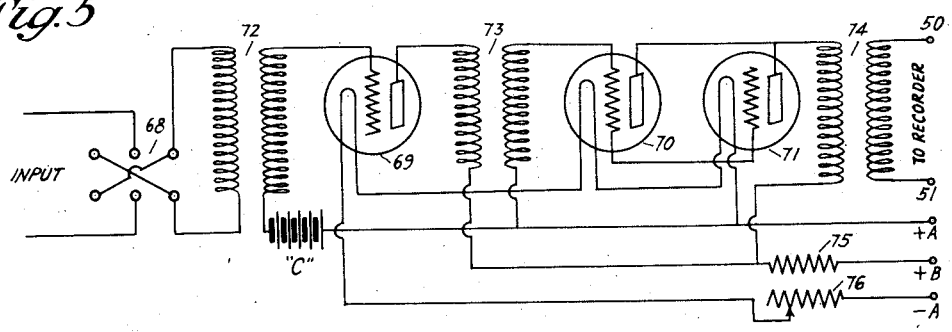
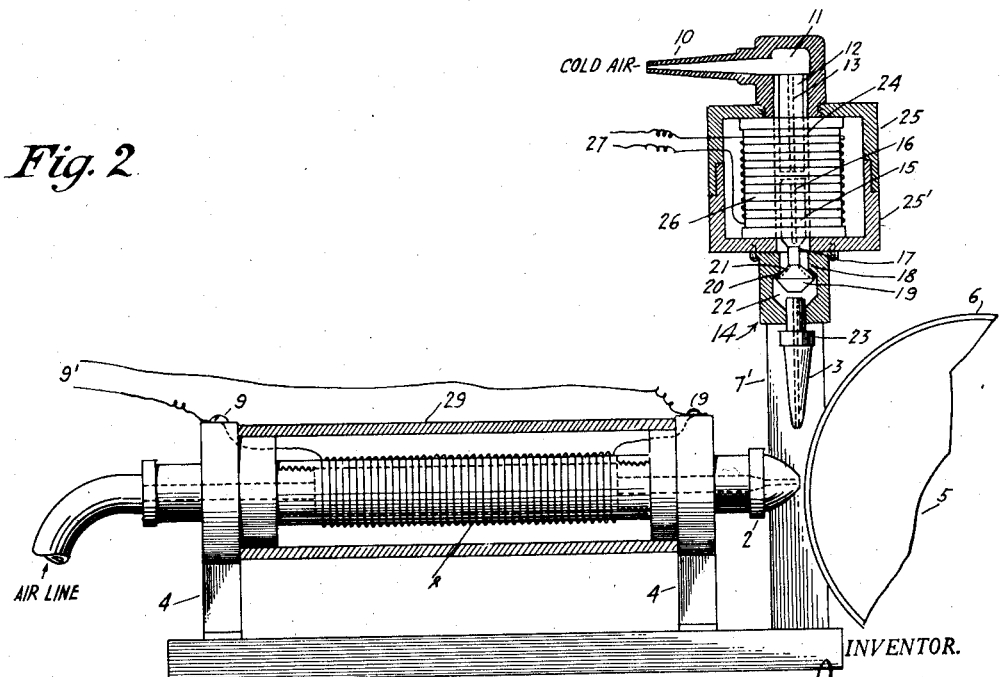
INVENTOR.
R. H. RANGER
BY
ATTORNEY

INVENTOR.
R.H. RANGER
BY
ATTORNEYS.

July 15, 1930.                  R. H. RANGER                     1,770,493
                      METHOD AND APPARATUS FOR PYRO-RECORDING
                   Original Filed Aug. 12, 1926    4 Sheets-Sheet 3

INVENTOR.
R. H. RANGER
BY
ATTORNEY

July 15, 1930.  R. H. RANGER  1,770,493
METHOD AND APPARATUS FOR PYRO-RECORDING
Original Filed Aug. 12, 1926   4 Sheets-Sheet 4

INVENTOR.
R. H. RANGER
BY
ATTORNEY

Patented July 15, 1930

1,770,493

UNITED STATES PATENT OFFICE

RICHARD HOWLAND RANGER, OF NEWARK, NEW JERSEY, ASSIGNOR TO RADIO CORPORATION OF AMERICA, A CORPORATION OF DELAWARE

METHOD AND APPARATUS FOR PYRO RECORDING

Application filed August 12, 1926, Serial No. 128,720. Renewed January 14, 1929.

The present invention relates to the method and apparatus for use in "pyro-recording", which is a term applied to a system for recording electrical impulses by translating them into heat and applying the subsequent heat pulses to heat sensitive paper. In the present system I desire to use a paper for recording which is treated with a heat sensitive substance which has been described and claimed in my copending application which was filed jointly with Richard Stewart Bicknell, Serial No. 303,108, filed Aug. 31, 1928.

An object of my invention is, therefore, to produce a system and means for supplying or rejecting heat against a heat sensitive recording paper for producing a pictorial record of received signals, and to provide a recording system which will be rapid, efficient, durable and substantially fool-proof in operation, and, at the same time, involve a minimum installation expense.

Other objects of my invention will become apparent from a consideration of the following description and drawings which form part of my disclosure.

The novel features which I believe to be characteristic of my invention are set forth in the appended claims, the invention itself however, both as to its organization and method of operation together with further objects and advantages thereof, will be best understood by reference to the following description and claims read in connection with the accompanying drawings, wherein:

Fig. 1 shows a hot and a cold air blast directed against a drum carrying a heat sensitive paper;

Fig. 2 is a detail showing the construction of the nozzles of Fig. 1;

Fig. 5 is a form of wiring diagram which might be used in connection with any of the heat producing means shown in Figs. 1 to 4 but preferably used with the showing of Fig. 4;

Figure 3:
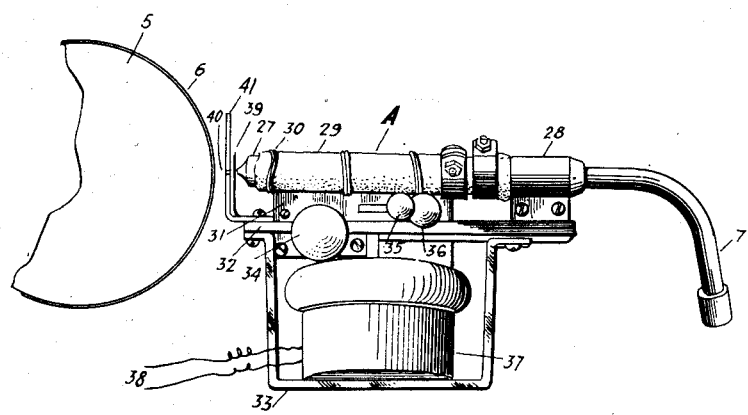
Fig. 3 is a modified form of nozzle for directing hot air or other gaseous blast against a heat sensitive paper.

In the following description, the medium supplied to the nozzles and which is directed against the heat sensitive paper will be described as an air blast or jet, since this has been found to work very satisfactorily, but I do not desire to limit myself to this specific form since any gaseous substance, such as, for example, nitrogen or carbon dioxide or a burning jet of gas is capable of such use and will operate equally as efficiently as air and are within the spirit and scope of my invention.

Referring to the drawings, in Fig. 1, I have shown a preferred form of heat directing means for producing the desired pigmentation on a chemically treated paper suitable for recording a picture or the like transmitted by wire line or radio. Upon a sliding base member 1 are mounted nozzles 2 and 3, of which, nozzle 2 will hereinafter be designated as the heated nozzle and the nozzle 3 as a cold blast nozzle. The nozzle 2 is supported from the base 1 on standards 4 and is directed toward a drum 5, which is rotatable and carries the heat sensitive paper 6. Supported on another U-shaped standard 7' from the base 1 is the cold blast nozzle 3. This nozzle 3 is so positioned that the path of the projected air or gas crosses that of the nozzle 2.

The nozzle 2 is supplied with air through an air line and the incoming air is heated by means of a resistance wire coil 8 which is wrapped around the nozzle in any preferred manner. The heated air is directed against the paper through an orifice 9 in the directing nozzle 2. To keep the heat developed by the heating coils 8 within the nozzle I have provided an asbestos coating 29 which is fastened by a wire wrapping 30 as shown by Fig. 3.

Referring to the structure of the nozzles 2 and 3 (see Fig. 2), the heating coil 8 of nozzle 2 is energized through terminals 9, 9 and lead wires 9'. The terminals 9, 9 may be insulated from the frame in any well known manner.

Making specific reference to the structure of nozzle 3, cold air is carried to the nozzle structure through a connecting tube 10 to a port 11 above the nozzle 3. From this port, the air is directed into a small iron cylinder 12 having a central opening 13 therethrough. Directly below the iron cylinder 12 is an electro-magnetic valve, generally designated 14. This valve 14 comprises a cylindrical stem 15 having a flute 16 on diametrically opposite sides thereof through which air may pass. Toward the bottom of this valve there is a necked portion 17 into which the incoming air from the supply 10 is passed and is held within a chamber 18 by the valve proper, 19. The valve 19 is provided with a conical seat 20 resting upon a valve seat 21 of the valve supporting structure. Directly below the valve seat is a second air chamber 22 from which leads a connecting passage 23 to the directing nozzle 3. The upper part of the valve and its structure together with the iron cylinder, is enclosed in a cylindrical casing 24 carried by a pair of U-shaped or cup-shaped (see Fig. 1) supports 25 and 25' which are mounted upon the U-shaped supporting standards 7'.

Carried within the U-shaped supports is an electro-magnet 26 to which current is supplied through leads 27. Upon current being supplied to the electro-magnet, the valve 14 will be drawn upward so as to bring the valve seat 19 into a closed position whereby air will be unable to flow. However, upon a decrease of current strength in the magnet, the valve 14 will respond to a gravitational effect and drop, so that air may pass from the supply 10 through chamber 11, through the opening 13 in the cylinder 12, through the fluted portion 15 of the valve 14, into the chamber 22 and from there into the nozzle 3. In this case the air pushing down against the valve and the weight of the valve is substantially balanced by the magnetic effect produced by the decrease in current strength through the magnet 26 which tends to draw the valve 19 back against the valve seat 21. The valve, however, will not drop sufficiently far to rest upon the opening into the passage 23.

The supply of cold air in this case is extremely even, due to the air cushioning effect in the chamber 22, which is caused by the fact that the opening into the nozzle 3 is relatively small and air is being supplied at a rapid rate into the supply 10 from an air tank (not shown). Thus with air coming into the chamber faster than it is leaving the same, there will be air under pressure in the chamber 22 and as above stated, by reason of the magnetic effect upon the valve under a decrease in current strength through the magnet the valve will not be able to drop sufficiently to close the opening into the nozzle 3 but is suspended within the chamber 22. Further description of the operation will be described hereinafter in a detailed description of the operation of the entire embodiment. The adjustment of the nozzle with respect to the recording surface is preferably accomplished in a manner similar to that shown and described in connection with Fig. 3.

In Fig. 3 I have shown a further modification of heat directing means in the form of a nozzle where air is supplied through a lead tube 7 to a nozzle which is generally designated as A. The air in nozzle A is directed against the heat sensitive paper 6 on a drum 5 through a jet 27, similar to that shown at 2 in Fig. 1. Herein, the operation is slightly different than that described in connection with Figs. 1 and 2, since all the air supplied is heated at all times and only a hot air blast is directed against the paper. The heating means for the air is the same as shown in Fig. 2. About the frame work 28 of the nozzle 27, is an asbestos coating 29 the purpose of which is to keep the heat within the frame work 28 of the nozzle A. The asbestos covering is fastened by means of wire wrapping 30.

The entire nozzle is supported on a slidable frame work 31 carried by a plate 32 supported on a U-shaped support 33 and is adjustable vertically by means of a knurled thumb screw 34 and horizontally with respect to the drum 5 by means of knurled thumb screws 35 and 36.

Supported in the U-shaped frame work 33 is a telephone receiver 37 which is connected through leads 38 to a receiving apparatus for signals such as has been described and claimed in other of my copending applications, for example, Serial No. 615,175, filed Feb. 16, 1924 and Serial No. 750,514 filed Nov. 18, 1924. Operated from the diaphragm (not shown) of this receiver is a shutter 39 which extends in front of the nozzle 27. This shutter is connected with the diaphragm by means of a system of levers or pivoted link members whereby a movement of the diaphragm will raise, lower, tilt or oscillate the shutter with respect to the nozzle an amount proportional to the strength of the incoming signal energy, so that the heated air may or may not pass from the nozzle to the heat sensitive paper. The air supply is directed against the heat sensitive paper through an orifice 40 in an L-shaped standard 41 located between the drum carrying the paper and the shutter above described.

Figure 4:
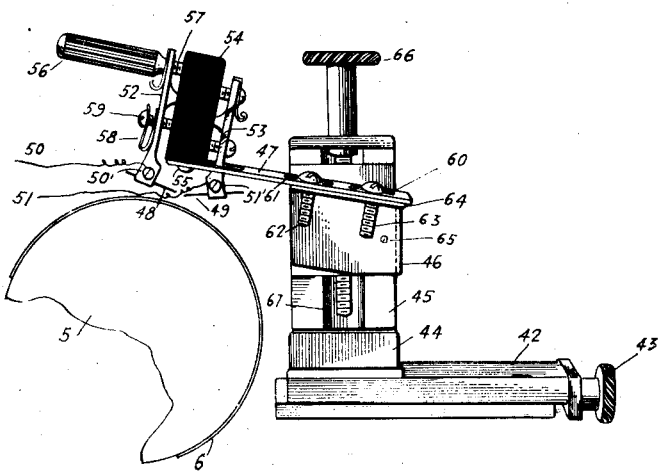
Fig. 4 is a still further modification of Fig. 1 showing a spark means for producing a reaction on the heat sensitive paper.

In Fig. 4 is shown a still further modification of the arrangement for supplying heat to the heat sensitive paper and this arrangement comprises what is known as a spark unit. The entire unit is mounted in a slidable frame work 42 which is capable of adjustment laterally by means of the thumb-screw 43. Upon the support 42 is a series of built-up supporting members 44, 45 and 46 which is for the purpose of bringing the electrodes, to be later described, to the proper height above the paper.

Carried on the block 46 is a supporting arm 47 for carrying the spark electrodes 48 and 49 which receive their energy through lead wires 50 and 51 connected to terminal points 50' and 51' directly above the electrodes. The electrodes 48 and 49 are mounted from rockable supporting members 52 and 53 which are carried by an insulating block 54, supported by means of screw 55 upon the carrying or supporting arm 47.

Adjustment of the electrodes 48 and 49 with respect to each other so as to vary the spark gap, is accomplished by turning the pin 56 which is threaded at 57 and screws into the block 54. The rockable arm 52 is yieldingly or flexibly supported with respect to the block 54 by means of a spring 58 mounted between a screw head 59 and the arm 52. The screw 59 is threaded into the block 54 and serves as an adjusting means to limit the outward movement of the electrodes along with the pin 56.

The electrodes are capable of being moved laterally with respect to the drum by means of slots 60 and 61 in the supporting arm 47 and are rigidly held by means of screws, 62, 63 extending into the plate 64 upon which the support 47 is carried. The plate 64 is an angular supporting means for the arm 47 and is held against block 46 by means of a screw 65.

For the purpose of obtaining a vertical adjustment of the electrodes relative to the recording paper, a small hand wheel or thumb screw 66 is threadedly mounted into the block 46 in its threaded end extending into a recess 67 in the block 45.

Thus, by loosening the screws 62 and 63, the electrodes may be laterally adjusted with respect to the drum 5 carrying the paper, and by turning the thumb screw 66 the electrodes may be vertically adjusted and further, by loosening screw 65 may be rotatably moved about this point so as to obtain adjustment in all directions.

Fig. 5 is a diagram of a suitable form of electric connection for the heat controlling means. This diagram is primarily intended for use with a spark form of heat producing means such as is shown in Fig. 4 but is capable of use with the forms shown in Figs. 1, 2 and 3. It would however be only necessary to connect the input terminals to the lead wires 27 of Figs. 1 and 2 and the telephone leads 38 of Fig. 3 since it is unessential to have an extremely high voltage. In other words, for efficient operation of the arrangements of Figs. 1, 2 and 3, the input terminals shown in Fig. 5 may correspond to the output of the well known push-pull circuit such as is shown in the patent to Colpitts, Reissue No. 14,380 dated October 23, 1917, since it is preferable to use the direct current output in order to avoid relay action and 40 to 50 mils current is sufficient. In Fig. 5 is shown an arrangement where the input may be either a rectified current or an alternating current with a frequency of approximately 1,000 cycles.

It is preferable to use a reversing switch 68 to connect the circuit arrangement of Fig. 5 to the recording means since it has been found that under certain conditions more efficient operation will be obtained with the switch in one position than in the other. The arrangement of Fig. 5 is simply a means to step-up the voltage so as to obtain the necessary potential for the electrodes 48 and 49 to cause a spark to jump between them and which, for all practical purposes, seems to be about 1,500 volts. The circuit arrangements which I have shown comprise merely three amplifying tubes 69, 70 and 71 of which tubes 70 and 71 are preferably connected in parallel and the energy from the input circuit is brought to the tube 69 through a transformer 72 having approximately a 1 to 9 ratio. The output from tube 69 is carried to the input of a transformer 73 having approximately a 1 to 9 ratio from the secondary of which it is fed into the tubes 70 and 71 which are connected in parallel and have their output connected to the primary of a transformer 74 having approximately a 1 to 3 ratio. From the secondary of transformer 74 the energy is carried to the connections 50 and 51 of the spark electrodes 48 and 49. In the A minus and B plus leads a resistance of approximately 200 ohms is inserted as shown at 75 and 76.

Figure 6:
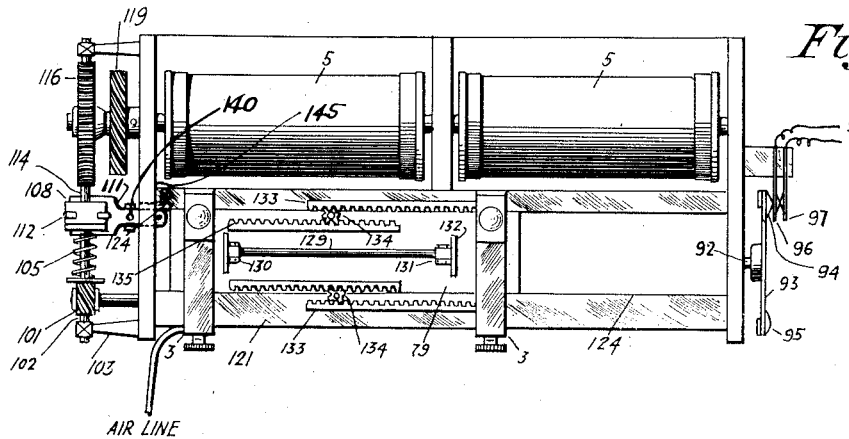
Fig. 6 is a top plan view of the machine for mounting the heat producing means.
Figure 7:
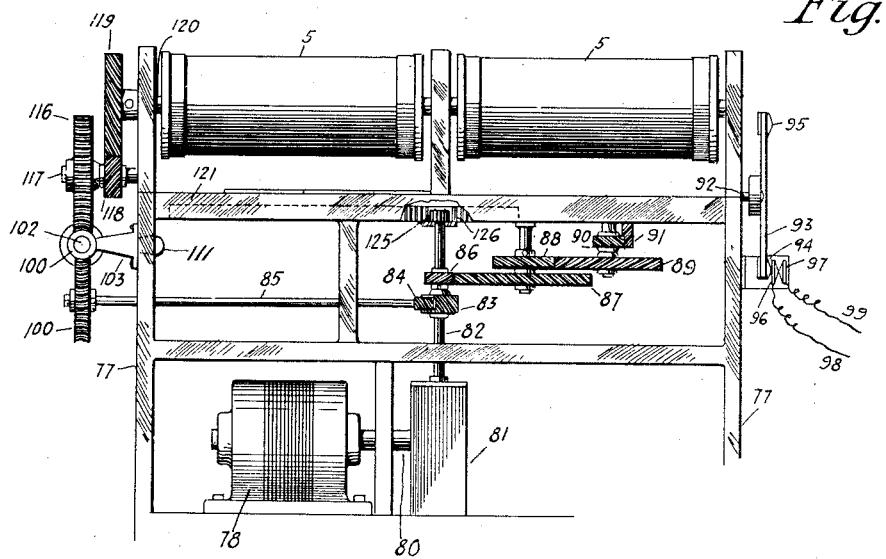
Fig. 7 is a front elevation of the same.

Making reference to the machine for carrying the air jet back and forth across the paper, the same consists of a frame 77 (see Figs. 6 and 7) upon which is carried a motor 78 for driving the reciprocating mechanism, generally designated by 79. The motor 78 turns a shaft 80 which drives, through a reduction gearing 81, a shaft 82 to which is connected a helical gear 83 with which meshes a worm 84 turning a shaft 85. Above the gear 83 is a second small gear 86 serving to rotate, through a series of gears 87, 88, 89, 90 and 91 a shaft 92. The shaft 92 turns an arm 93 upon which are two cam surfaces 94 and 95. The gear train from 86 to 91 is so arranged that the shaft 92 will turn one-half revolution for each stroke of the jet mechanism (to be described later). Upon each half revolution of the arm 93 the cam surfaces 94 or 95 will serve to bring contact points 96 and 97 together, whereby a circuit through wires 98 and 99 will be closed, the purpose of which will be later described.

Figure 8:
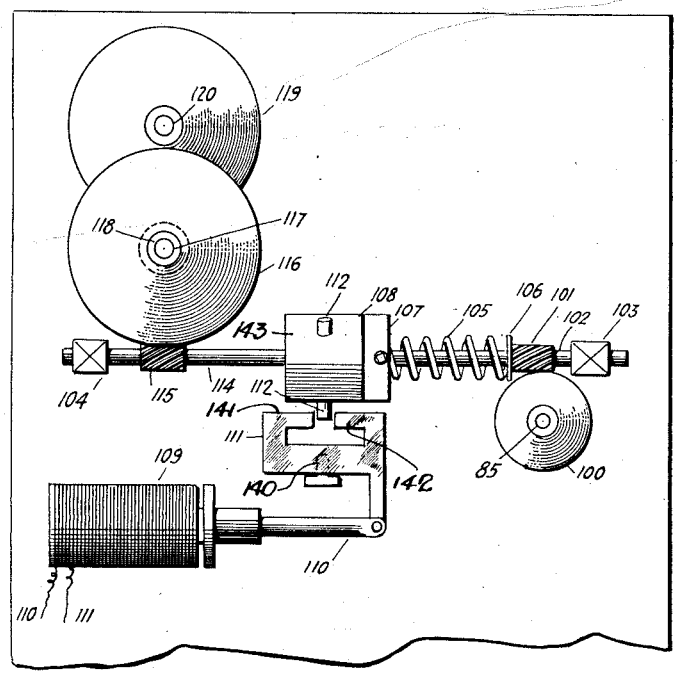
Fig. 8 is a left hand view of the machine showing the means for advancing the paper supporting drum.
Figure 9:
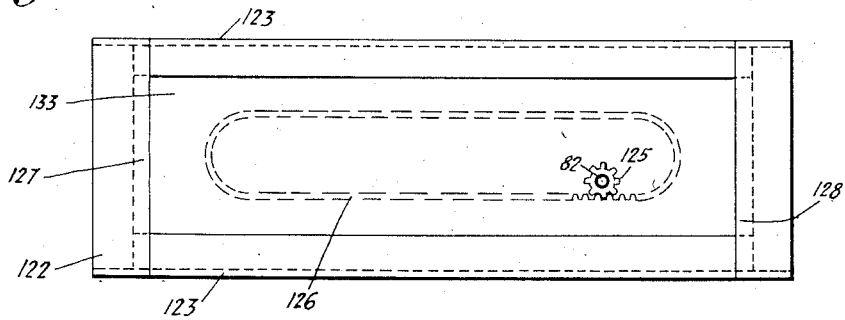
Fig. 9 is a detail showing preferred means for carrying the heat producing means back and forth across the paper.

Referring to the rotating shaft 85, at the opposite end of the worm 84 is connected a gear 100 which meshes with a worm 101 attached to a shaft 102 mounted in a bearing 103. Upon the shaft 102 is placed a spring 105 which presses on one end against a collar 106 (see Fig. 8) adjacent the worm 101 and on the other end, against a collar 107 which forms one portion of a slip clutch mechanism, generally designated 108. The function of the slip clutch mechanism is to rotate the drum 5 carrying the heat sensitive paper 6. The clutch mechanism 108 operates through an electro-magnet 109 having connections 110 and 111 which are connected with the contact points 96 and 97 hereinbefore mentioned. When the contacts 96 and 97 are closed a circuit is completed which will energize the magnet 109 which will, in turn, pull a link mechanism 110 to the left as shown in Fig. 8. Upon the link 110 being pulled to the left, the U-shaped clutch trip mechanism 111 will be moved about the pin 140 as a pivot point so that the projections 141 and 142 of the trip mechanism will catch the pins 112 as they rotate. It may thus be seen that a movement of the U-shaped trip mechanism 111, which is preferably held by a spring 145, about pin 140 will cause the projections 141 and 142 to move so as to free one of the pins 112 and permit motion of the clutch portion 143 with respect to the trip mechanism 111 due to the force of the spring 105 acting against collar 107 which presses against the clutch portion 143 to cause the worm 101 to drive the clutch 108 for an instant with the parts 107 and 143 forming a friction drive connection. This driving action of 107 upon 143 will continue until the magnet has been deenergized (which is as soon as contacts 96, 97 are broken) and the next contact pin 112 is rotated, in a counter-clockwise direction as shown, so as to strike against the projection 141 from which it slides to bear against the projection 142 and hold the clutch portion 143 stationary with respect to the moving part 107, for the motion of the clutch portion 143 is due to the frictional drive between 107 and 143 and with part 143 locked the collar 107 merely slips on the driving face. When the clutch portion 143 is rotated at the end of each stroke of the recording means with respect to drum 5 the shaft 114 will be turned so as to rotate the worm 115 driving the helical gear 116 mounted upon the shaft 117. Upon the same shaft 117 is mounted a pinion 118 meshed with a gear 119. The gear 119 is mounted upon a shaft 120 which extends through the frame work 77 and supports a pair of drums 5, 5. It is thus seen that the drum 5 is stepped a fractional part of a turn each time the contacts 96, 97 are closed and that a new part of the recording surface carried by drum 5 is subjected to the action of the signal actuated recorders.

From the above description it is seen how it is possible to advance the paper mounted upon the roll or drum 5 and how the necessary feature of operation is to reciprocate the heat supply with respect to the paper supporting means. This is accomplished by mounting the nozzles 3 or any of the types described in Figs. 1 through 4, upon guides 121 carried by the frame work 77. These nozzles are rigidly fastened to a support plate 122 having V-shaped grooves 123, sliding in complementary shaped guides 124 which form part of the guides 121. For the purpose of reciprocating the nozzles 3 which are mounted upon the plates, a third pinion 125 is fixed on the shaft 82 and meshes with an orbital rack 126 which is carried beneath the plate 122 and is capable of transverse sliding with respect thereto in the guides 127 and 128. This motion is well known as a mechanical movement and serves as no part of my invention since any other well known form might be equally well substituted.

For the purpose of keeping the guides in proper alignment, I have provided a rocking shaft 129 which is supported in bearings 130 and 131 on the frame work or support 121 and carries a rocker 132 having links (not shown) connected with the frame work 133 of the orbital rack.

For the purpose of taking up slack in the motion of the reciprocating jet, I have provided part of the supporting frame 121 on each side with a rack 133 with which a pinion 134 meshes. This pinion 134 also meshes with a second sliding rack 135 which reciprocates with the movable frame.

I will now briefly describe the operation and function of my invention.

When pictures are to be recorded, the energy is supplied through a receiving circuit of any preferred form such as has been defined by my copending applications Serial No. 615,175, filed Feb. 16, 1924 and Serial No. 750,514, filed Nov. 18, 1924, previously referred to. This energy input is used to control any of the proposed heat directing means. In using the preferred form of heat directing means which consists of the heated and the cold air jets directing their stream of air against the paper, the signal energy is fed to a hollow electro-magnet in which is placed an electro-magnetic valve as in Figs. 1 and 2. This current energizes the magnet sufficiently to draw the electromagnetic valve back into the hollow magnet and thus shut off the air supply because air will be unable to pass beyond the valve seat 21. Under this condition the heated air from the hot air nozzle will direct itself against the paper, but when the current strength of the received signal is reduced, the energy in the electro-magnet is decreased and is insufficient to hold the valve against the action of gravity which acts to lower it and permit the cold air to flow past the valve seat and out through the vertical nozzle. Under this condition the cold air which may, if desired, be at a slightly higher pressure than the hot air, crosses the path of the hot air jet and dissipates or deflects the heated air, thus preventing the heated blast from reaching the heat sensitive paper whereby the pigmentation or coloration is substantially reduced. The action of cold air jet, is proportional to the dot and dash impulses of ordinary wireless telegraph communication and when the signal energy is derived from photo-electric cells actuated at a transmitting source by the varying intensity of light reaching the same through the picture to be transmitted, it will produce a high or a low current flowing through the magnet depending upon the light and dark spots in the picture, and thus control the valve regulating the cold air.

With the nozzles reciprocating back and forth across the heat sensitive paper in a manner such as above described, and the paper moved step by step for each reciprocation, a picture may be traced line by line until the entire picture is recorded. As before defined the gear train operating the rotating arm 93 for closing a contact to the electro-magnet 109 which controls the slip clutch used to rotate the drum 5 must be very carefully selected so that the shaft 92 will turn one-half revolution for each movement of the pinion 125 over one half of the surface of the orbital rack 126 so that the paper will be advanced only at the end of each complete stroke of the nozzle across the face of the paper. Each time the electro-magnet 109 is energized so as to permit the drum to rotate it will move the drum a circumferential distance of approximately 1/120 of an inch. This distance has been selected because of the desirable result when the picture is finished, for with 120 lines to an inch it has been found, by considerable experimenting, that the picture resulting is much clearer than in any other form.

The principal advantage of such a method of recording by means of a heated air jet is in the fact that it is possible to obtain great speed of recording such as has not heretofore been practical due to the fact that recording in the past has been with wax papers and these caused pictures which were more or less messy and recording was inaccurate due to tailing in the signals because of the dragging out of the chemical action of the needles on the wax treated chemical paper. With the apparatus above described I propose to use a chemically treated paper coated with a heat sensitive substance such as is disclosed in my patent application Serial No. 303,108, filed Aug. 30, 1928, hereinbefore mentioned. With the use of this type of paper such tailing of signals and dragging out of chemical reaction is not possible because the paper consists of some oxidizing agent which will readily break down when heated to liberate nascent oxygen which will combine with the other substances present in the sphere of action to produce an instantaneously visible effort such as, for example, a slight scorching of the paper, the formation of a metallic pigment, a polymerization reaction yielding a dyestuff, minute and confined explosions in the coating, as well as other reactions.

Having described my invention, I am entitled to all modifications thereof that fairly fall within the spirit and scope as defined by the following claims.

I claim:

1. The method of recording pictures which comprises the directing of a heated gaseous blast against a heat sensitive substance and regulating the amount of heat directed against said substance for producing pigmentation thereon proportional to the tone characteristics of the desired image.

2. The method of recording pictures which comprises the directing of a heated air blast against a material coated with a heat sensitive substance, and controlling the amount of heat directed for producing pigmentation thereon proportional to the tone characteristics of the desired image.

3. The method of recording pictures which comprises directing a hot air jet against a material coated with an easily heat reducible metallic compound, and controlling the amount of heated air directed against said material for producing pigmentation thereon proportional to the tone characteristics of the desired image.

4. The method of recording pictures which comprises the directing of a hot gaseous jet against a fibrous material coated with an easily heat reducible nitric substance, and controlling the heat of said directed jet for producing pigmentation thereon proportional to the tone characteristics of the desired image.

5. An arrangement for recording pictures comprising a supporting means, a heat sensitive paper mounted thereon, a heat producing means adjacent said paper and at a fixed predetermined distance therefrom, means for restricting said heat to a small area of said paper at any instant, means for controlling the intensity of the heat reaching the said paper, and means for moving said heating means back and forth transversely of the said paper.

6. An arrangement for recording pictures comprising a supporting means, a heat sensitive recording substance mounted on said support, a heat producing means adjacent said substance and at a fixed predetermined distance therefrom, means for restricting the said heat from said source to a small area of said substance at any instant, means for controlling the intensity of said heat, and means for moving said heat producing means as a unit back and forth and transversely of said substance support.

7. An arrangement for recording pictures comprising a rotatable supporting member, a heat sensitive paper mounted thereupon, means adjacent said supporting member for directing a heated gaseous jet upon said paper, and means for controlling the amount of heat reaching said paper, said controlling medium being adapted to regulate the heat for producing pigmentation thereon proportional to the tone characteristics of the desired image.

8. An arrangement for recording pictures comprising a rotatable drum support, a paper sheet provided with a coating of heat sensitive material mounted thereon, an air jet, means for heating the air issuing from said jet, means for directing said heated air to said paper sheet, means for moving said directed heated air across said paper, and means for controlling the amount of said heated air directed to said paper for producing pigmentation on said coated material proportional to the tone characteristics of the desired image.

9. An arrangement for recording pictures comprising a rotatable drum support, a paper sheet provided with a heat sensitive gelatinous coating carried by said support, means for producing heat adapted to produce a chemical change to said paper proportional to the pigmentation of the picture received, a jet for directing said heat to said paper, means for moving said jet back and forth across said paper, and means for controlling said heat issuing from said jet to said paper.

10. An arrangement for recording pictures comprising a support, a heat sensitive substance adapted to record pictures mounted upon said support, an air blast, means for heating said air, means for directing said heated air to said heat sensitive substance, means for moving said heated air back and forth across said heat sensitive substance, and means for controlling the heat of said air, said control means being adapted to supply an amount of heat for producing pigmentation thereon proportional to the tone characteristics of the desired image.

11. An arrangement for recording pictures comprising a rotatable drum support, a paper coated with a heat sensitive substance mounted thereupon, an air blast, means for heating said air, said heating means consisting of heating coils wrapped about said air blast, means for directing said air against said paper, and means for continuously moving said air jet back and forth across said paper, whereby all parts of the paper may be subjected to said heated air.

12. An arrangement for recording pictures comprising a support, a heat sensitive paper mounted thereon, an air jet directed against said paper, means for reciprocating said jet transverse to said paper, means adapted to advance said paper with respect to said air jet upon each transverse movement of said jet, means for heating said air, and means for controlling the amount of heat reaching said paper for producing pigmentation thereon proportional to the tone characteristics of the desired image.

13. An arrangement for recording pictures comprising a drum, a paper coated with a gelatinous nitric composition mounted upon said drum, a plurality of air jets directed against said paper, means for heating the air in one of said jets, means for controlling the amount of air flowing from the other of said jets, and means for directing the air from said jets with respect to each other so as to make their paths cross, whereby cold air flowing from one of said jets prevents said heated air from reaching said paper and produces the desired pigmentation.

14. An arrangement for recording pictures comprising a support, a heat sensitive fibrous material mounted thereon, and adapted to record said picture, a heated air jet directed against said fibrous material, means for mounting said jet adjacent said support, means for reciprocating said jet across said paper, means for advancing said paper with respect to said air jet at each reciprocation, means for heating said air in said jet, and means for controlling the amount of heat, said control being adapted to regulate the amount of heat from said jet which reaches said heat sensitive material so as to produce pigmentation thereon in proportion to the tone characteristics of the desired image.

15. An arrangement for recording pictures comprising a rotatable supporting means for a heat sensitive recording paper, a hot air jet directed against said recording paper, a cold air jet directed across the path of said hot air jet, means for mounting said jets for reciprocating as a unit with respect to said paper carrying member, means associated with said cold air jet for regulating the air flow therefrom whereby the amount of heat reaching said paper from said heated jet is controlled proportional to the pigmentation of the desired image.

16. The method of recording pictures which comprises directing a jet of heated air against a heat sensitive material, directing a second jet of cold air across the path of the hot air jet and diffusing the latter for producing pigmentation on said material proportional to the tone characteristics of the desired image.

17. An arrangement for recording pictures comprising a support for a heat sensitive recording paper, a plurality of nozzles adjacent said paper, and adapted to direct a gas thereagainst, means for moving said nozzles transverse to said paper, means for advancing said paper at the end of each nozzle movement, means for heating the gas in one of said nozzles, and means for controlling the flow of gas from the other of said nozzles whereby the amount of heated gas reaching said paper is regulated so as to produce pigmentation thereon proportional to the tone characteristics of the desired image, said control means of said cold gas nozzle consisting of electro-magnetic means adapted to operate in accordance with the incoming signals.

18. The method of recording pictures which comprises the directing of a heated gaseous blast upon a heat sensitive substance, and the deflecting of the heated blast from said substance in a manner, whereby the heated blast which reaches said substance produces a record having like tone characteristics of an originally transmitted picture.

19. An arrangement for recording pictures comprising a support for carrying a recording surface, a heated air jet arranged normal to said support surface, a second signal controlled air jet arranged to direct an air blast substantially tangent to said support surface, means for obtaining a relative motion between said air jets and said support surface, and means provided by said tangent jet for deflecting the amount of heated air projected from said normal jet against a recording surface positioned on said support, whereby a record closely approximating the original transmitted record is obtained.

20. An arrangement for producing pictures comprising a drum-like supporting surface for carrying a heat sensitive recording medium, an air jet arranged normal to said support surface, means for heating the air directed from said air jet toward said support surface, a second air jet supported above said first named jet and arranged to project the air flowing therefrom in a path transverse to the path of air from said first jet and in a path approximately tangent to the said support surface, means for controlling the air flowing from said second named jet in accordance with received signalling impulses, whereby the heated air projected from said first named jet to said support surface is deflected and dissipated in proportion to received signalling impulses and the heated air produces a visible record closely approximating an original transmitted picture.

21. A recording system including a support for carrying a recording surface, means for projecting a constant flow of recording fluid toward said support for producing a record on the recording surface carried thereby, and means for controlling the amount of fluid reaching said support in accordance with received signal pulses.

22. A recording system including a support for carrying a recording surface, means for projecting a constant flow of recording fluid toward said support for producing a record on the recording surface carried thereby, means actuated in accordance with received signalling pulses for controlling the amount of recording fluid reaching said support, and means for obtaining a relative movement between said support and said fluid projecting means for producing a continuous record of received signals.

23. In a recording system for pictures and the like, a support surface for carrying a heat sensitive recording medium, means for projecting a heated recording fluid normally with respect to said support surface, means for obtaining a relative movement between said support surface and said fluid projecting means, and means positioned between said fluid projecting means and said support surface for controlling the amount of heated recording fluid projecting against said support surface.

24. A method of recording signals on a recording surface which consists in collecting signal energy pulses to be recorded, in projecting a recording fluid toward the recording surface, and in deflecting the recording fluid projected toward said recording surface in accordance with the collected signal pulses.

25. A method of recording signals on a recording surface which consists in collecting signal energy pulses to be recorded, in projecting a constant flow of recording fluid toward a recording surface, and in deflecting the recording fluid projected toward said recording surface in accordance with the collected signal pulses.

26. A method of recording signals on a thermosensitive recording medium which consists in collecting signal energy pulses to be recorded, in directing an undiminished flow of heated recording fluid toward the recording surface, and in varying the amount of heated recording fluid reaching the said surface in accordance with the strength of the collected signal pulses.

27. A method of recording signals on a thermosensitive recording surface which consists in collecting signal energy pulses to be recorded, in projecting a constant flow of heated recording fluid toward the recording surface, and in controlling the effect of said fluid on said surface in accordance with the strength of the collected signal pulses.

28. A method of recording signals on a thermosensitive recording surface which consists in collecting signal energy pulses to be recorded, in directing a constant flow of heated recording fluid toward the record surface, in controlling the amount of heated fluid reaching the said surface in accordance with the strength of said signal pulses, and in maintaining a relative movement between the recording surface and the projected fluid for producing a continuous record of said recorded signal pulses.

29. A method of recording signalling impulses on a thermosensitive recording surface which consists in collecting signal energy impulses to be recorded, in projecting a constant flow of recording fluid toward the recording surface, and in deflecting the amount of recording fluid projected toward said surface in accordance with collected signalling impulses for producing a recorded signal corresponding to the received signalling impulses.

30. A method of recording signalling impulses on a thermosensitive recording surface which consists in receiving signalling impulses, in projecting a recording fluid in a predetermined thermal state toward the recording surface, and in deflecting the projected fluid from the normal projection path by the influence of received signalling impulses for producing a record corresponding to received signals.

RICHARD HOWLAND RANGER.